United States Patent

[11] 3,596,312

| [72] | Inventor | Koei Ohmatsu |
| | | 1137, Sei, Gifu, Japan |
| [21] | Appl. No. | 10,207 |
| [22] | Filed | Feb. 10, 1970 |
| [45] | Patented | Aug. 3, 1971 |
| [32] | Priority | Nov. 16, 1966, Jan. 28, 1967, Jan. 28, 1967 |
| [33] | | Japan |
| [31] | | 41/75859, 42/5684 and 42/5685 |
| | | Continuation of application Ser. No. 682,046, Nov. 13, 1967, now abandoned. |

[54] APPARATUS FOR PRODUCING SYNTHETIC RESIN FIBERS UTILIZING CENTRIFUGAL FORCE
6 Claims, 6 Drawing Figs.
[52] U.S. Cl. .................................................. 18/2.6, 18/8 A, 264/165, 264/8
[51] Int. Cl. ...................................................... B29c 23/00, D01d 5/08
[50] Field of Search .......................................... 18/8 A, 8 SR, 8 SS, 12 C, 14 R, 2.4, 2.6, 2.7; 264/165

[56] References Cited
UNITED STATES PATENTS

| 1,500,931 | 7/1924 | Hooper .......................... | 18/8 |
| 2,742,667 | 4/1956 | Clouzeau et al. .............. | 18/8 |
| 3,040,377 | 6/1962 | Slayter et al. .................. | 18/8 |
| 3,273,200 | 9/1966 | Shrensel ......................... | 18/8 |

Primary Examiner—J. Spencer Overholser
Assistant Examiner—R. L. Spicer, Jr.
Attorney—Karl W. Flocks ABSTRACT: Apparatus for producing a synthetic resin fiber, in which a synthetic resin material is charged into a hollow rotary body and made molten therein, or said synthetic resin material is charged into the hollow rotary body in the molten state, heat is applied within the hollow rotary body by the presence of internal heaters, and the hollow rotary body is rotated at high speed, whereby the molten resin material is ejected through nozzles or slits formed in the peripheral wall of the hollow rotary body by the centrifugal force developed therein and thereby a twisted fibrous yarn of said resin material is produced continuously by continuous removal in the axial direction.

PATENTED AUG 3 1971 3,596,312

APPARATUS FOR PRODUCING SYNTHETIC RESIN FIBERS UTILIZING CENTRIFUGAL FORCE

RELATED U.S. APPLICATION

This is a continuing application of Ser. No. 682,046, filed Nov. 13, 1967, now abandoned, and is filed under the provisions of 35 U.S.C. 121.

BACKGROUND OF THE INVENTION

1. Field of the Invention

The present invention relates to a method and an apparatus for producing a synthetic resin fiber by ejecting a molten synthetic resin material through nozzles or slits by making use of a centrifugal force developed therein, and to a rotary body to be used therein.

2. Description of the Prior Art

In the production of the fibers from synthetic resin materials generally, various methods have been used heretofore but these have required a considerable amount of labor before completion of the spinning operation. For instance, the so-called melt spinning method, which comprises melting a thermoplastic organic linear high polymer, such as polyamide, polyethylene, polystyrene, polypropylene or vinyl which can be softened and melted by heat before it is pyrolyzed, ejecting the molten polymer through nozzles under pressure into filaments as by extrusion, and thereafter cooling the filaments thus formed, had the drawback that the inconsistent rate of flow of the resin at various points results in the temperature of the resin being nonuniform, with the consequent unevenness or local pyrolysis occurring in the filaments in the spinning industrially of a large number of filaments. Further, according to this method, much labor has been required subsequent to the spinning operation, because yarn is formed from these melt-spun filaments by drawing the extrusion-spun filaments several times by a draft machine, imparting a desired strength to the filaments, cutting the filaments into short lengths and gathering said short filaments to form a spun yarn. Still further, the nozzles or the slits must be highly precise dimensionally, because the diameter of the product yarn is influenced by the diameter and number of the nozzles or slits, and, therefore, not only has much difficulty been encountered in the fabrication of the spinneret, but also the amounts of polymer being ejected through the respective nozzles or slits tend to become inconsistent, with the result that unevenness occurs in the resultant yarn.

SUMMARY OF THE INVENTION

The object of the present invention, therefore, is to provide a method and an apparatus for producing synthetic resin yarns and to provide a rotary body to be used therein, which obviate the aforementioned drawbacks of the conventional methods.

Namely, according to the present invention, there is provided a method of producing synthetic resin yarns and an apparatus for practicing said method, which method comprises 1. charging a granular or flaky synthetic resin material into a hollow rotary body having formed in the peripheral wall thereof a number of ejection holes such as nozzles or slits and adapted to be rotated at high speed;

2. melting said synthetic resin material in said rotary unit by heat applied from therewithin, or melting said synthetic resin material by heat beforehand and thereafter charging said molten resin material into said hollow rotary body by means of an extruder and applying additional heat from within the rotary body; and 3. rotating the hollow rotary body at high speed to eject molten resin material through the ejection holes under the centrifugal force developed therein, thereby forming short filaments which are twisted together and removed axially as a twisted spun yarn, the spun yarn being taken up on takeup means or winding means continuously.

DESCRIPTION OF THE PREFERRED EMBODIMENTS

Figure 1:
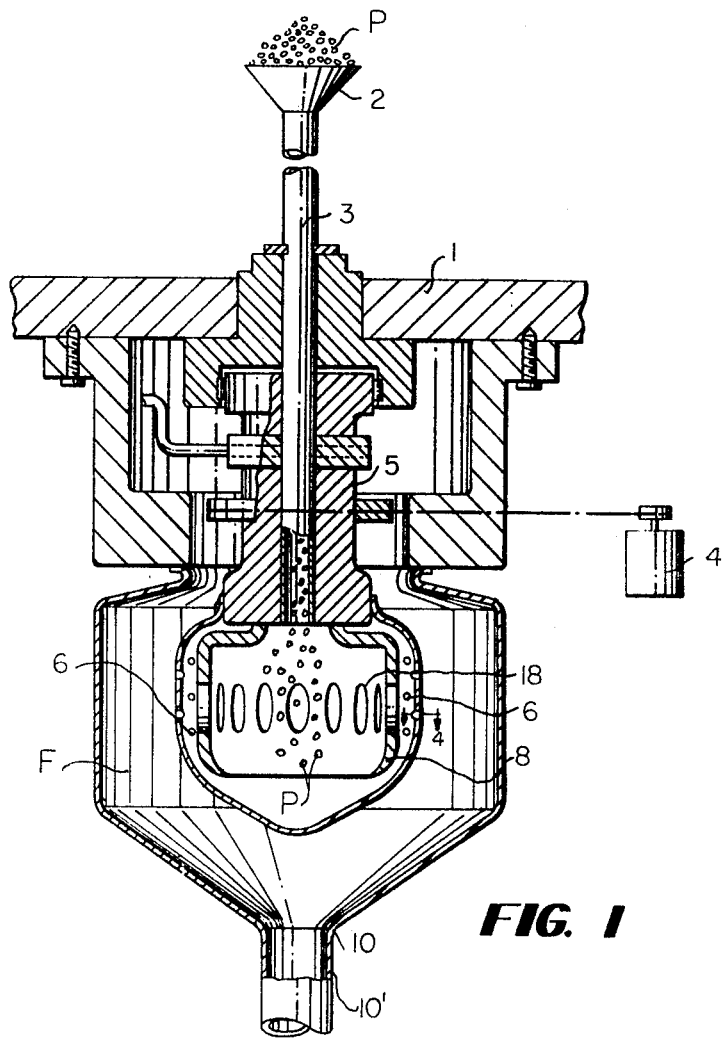
FIG. 1 is a cross-sectional front view of a first embodiment of the apparatus according to the present invention.

Describing the first embodiment of the present invention with reference to FIG. 1, a material feed tube 3 having a hopper 2 provided at the top end thereof is vertically supported by a machine frame 1. A hollow rotary body 7, preferably generally cylindrical, has a number of ejection holes 6,6..... such as nozzles or slits formed in the peripheral wall thereof and is mounted to the lower end of a tubular support member 5 which is mounted on the lower portion of the material feed tube 3, with the lower end of said material feed tube open to the interior hollow of the rotary unit. The rotary member 7 is adapted to be rotated at high speed by a drive means 4. The bottom surface of the rotary body 7 is shaped into substantially conical configuration converging to the bottom end and an annular heater 8 is provided inside the rotary body 7 adjacent the interior wall thereof to heat a synthetic resin material charged therein, the heater 8 being open at its bottom and having openings 18 in its sidewall.

The exterior of the rotary body 7 is surrounded by an enclosure member 9 with a certain space interval therebetween, which enclosure member 9 has its interior wall shaped in substantially the same configuration as the rotary body 7. An exit 10 is provided at the open bottom end of the enclosure 9 coaxial with the axis of rotation of the rotary body 7. An exit duct 10' leads from the exit 10, the other end of said duct being connected to a sliver takeup or winding means, not shown.

In producing a synthetic resin fiber using the apparatus of the present invention as described above, a granular or flaky thermoplastic resin material P, such as polyamide, polyethylene, polystyrene, polypropylene or vinyl resin, which is contained in a material storage tank (not shown), arranged above the apparatus, is continuously fed into the rotary body 7 from the hopper 2 through the feed tube 3, or, alternatively, said resin material may be fed into the rotary body through the material supply tube in a plastic state after having previously been melted by heat. The tubular support member 5 mounted on the feed tube 3 is rotated by the drive means 5, with the rotary body 7 integral with said support member rotating at high speed, and the annular heater 8 provided inside the rotary body 7 and rotating therewith, is energized by conducting a current therethrough. The synthetic resin material in the rotary body 7 is melted by the heat from the heater 8 and is maintained in the molten state.

As a result, the molten resin material is subjected to a strong centrifugal force and ejected tangentially into the space defined by the rotary body 7 and the enclosure member 9 in the state of mist through the ejection holes 6,6, such as nozzles or slits, formed in the peripheral wall of the rotary body 7. The molten material thus ejected is immediately cooled to solidify while being drawn by the action of the centrifugal force, and is automatically continuously discharged from the enclosure member 9 in the shape of a twisted spun yarn of fine filaments and is taken up by the takeup means or winding means (not shown) through the duct 10' connected to the bottom end of said enclosure member, to be sent to a successive step, if desired. In this case, a desired length of monofilament can be obtained by suitably adjusting the temperature of the molten resin material and the r.p.m. of the rotary body.

According to the present invention, as described above, a molten resin material is spun by making use of the centrifugal force developed within the rotary body 7 and the centrifugal force can be increased by increasing the r.p.m. or the inner radius of the rotary body 7. Therefore, the short linear filaments formed by the molten resin material, ejected outwardly through the ejection holes 6,6, ..... in the peripheral wall of the rotating rotary body, are solidified while being drawn by the action of the strong centrifugal force and immediately form a yarn having great strength and adapted for practical use, which yarn is subsequently taken up by the takeup means or winding means. The continuous yarn thus taken up on the takeup means or winding means can be sent to any successive step desired.

As can be seen from the foregoing, the present invention enables the steps of drawing and cutting the filaments to be eliminated completely, which would otherwise be required subsequent to the spinning operation. Moreover, according to the present invention, there is no material consumed wastefully because that part of the synthetic resin material P which has dropped on the converged bottom end of the rotary body 7 during material charging through the material feed tube 3, is moved upwardly along the conical surface of the rotary body by the action of centrifugal force and ultimately brought to the positions of the ejection holes 6,6, ..... to be ejected outwardly therethrough in a rectilinear state. Still further, since the synthetic resin material P is always maintained in a molten state by the heat from the internal heater 8 provided in the rotary body 7, it is possible to effectively make use of the centrifugal force in ejecting said molten material through the ejection holes. Still further, since the yarn formed within the enclosure member 9 is taken up by the takeup means or winding means through the duct 10' connected to the bottom end of said enclosure member, it can be supplied for the following step at once as a uniform yarn. Thus, the embodiment of the present invention described and illustrated hereinabove has the advantage of improving the quality of the product and enhancing the operation efficiency remarkably as compared with the conventional method. Since the rotation is in one direction, as the filaments form and become intertangled and are withdrawn as a yarn through the axial exit 10, a twist is imparted to the yarn.

Figure 2:
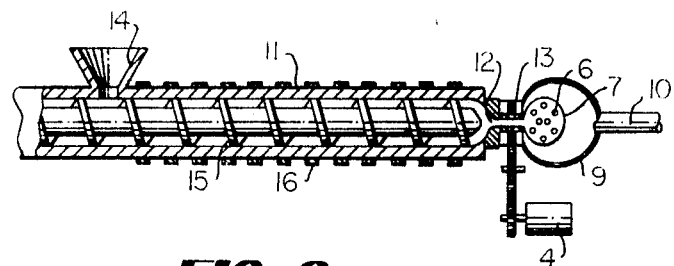
FIG. 2 is a cross-sectional front view of a second embodiment of the apparatus of this invention.
Figure 3:
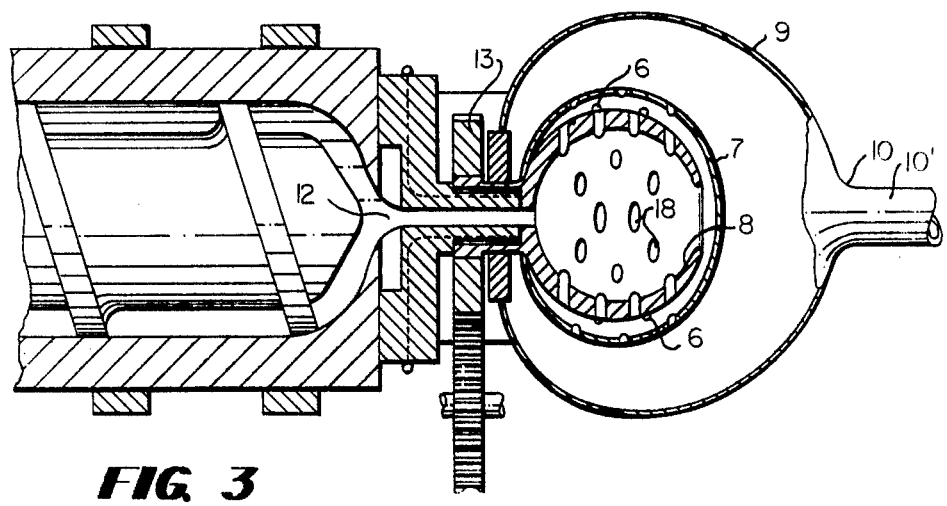
FIG. 3 is an enlarged fragmentary view of the apparatus shown in FIG. 2.

Now, the second embodiment of this invention will be described hereunder with reference to FIGS. 2 and 3. In this embodiment, a substantially spherical rotary body 7, having a number of ejection holes 6,6, ....., such as nozzles or slits, formed in the peripheral wall thereof, is rotatably mounted to the discharge port 12 at an end extremity of a conventional extruder (the one shown in the Figures is of the screw-type) in communication therewith. Fixedly mounted on the neck portion of the rotary body 7 is a gear 13 which is adapted to be rotated at high speed by drive means 4. The exterior of the rotary body 7 is enclosed by the enclosure member 9 of substantially the same configuration as said rotary body 7 and the front open end of the enclosure member 9 has an axially aligned exit 10 connected to the duct 10' which in turn is connected to conventional takeup means or winding means (not shown). The interior of the rotary body 7 is provided with an annular heater 8, having openings 18, by means of which the material resin fed into the rotary body 7 by the extruder 11 is maintained in a molten state.

In producing a synthetic resin fiber with the apparatus of the structure described above, a granular or flaky thermoplastic synthetic resin material, such as polyamide, polyethylene, polypropylene or vinyl resin, is fed into the extruder 11 through a hopper 14 provided thereon. The synthetic resin material fed into the extruder is conveyed therein forwardly by a rotating screw 15, while being melted by the heat from a heater 16 arranged peripherally of the extruder, and is discharged into the rotary body 7 through the discharge port 12 at the forward end extremity of the extruder. The rotary body 7 is driven at high speed by the drive means 4, so that the molten resin material fed into the rotary body is ejected outwardly into the interspace between the enclosure member 9 and the rotary body 7 through the ejection holes 6,6, ..... in the state of a stream. The resin material thus ejected is immediately cooled to solidify while being drawn by the action of centrifugal force and the resultant fine filaments are twisted together and delivered through the duct 10, connected to the front end of the enclosure member 9, automatically in the form of a twisted yarn to be taken up continuously by the takeup means or winding means (not shown). The yarn thus taken up by the takeup means or winding means is supplied for the succeeding step. In this case, the resin material fed into the rotary body 7 from the extruder 11 is maintained in the molten state by the heat from the heater 8 provided inside the rotary body, so that the molten resin is maintained at proper viscosity to be completely ejected through the ejection holes 6,6, ..... .

According to this embodiment of the present invention, since the synthetic resin material is fed into the rotary body, rotating at high speed, from the extruder in a molten state and is ejected through the ejection holes in the peripheral wall of the rotary body to form a yarn of fine filaments, and the yarn thus formed is delivered to the takeup means or winding means to be taken up thereon through the duct 10 connected to the front end of the enclosure member 9, the filaments formed peripherally of the rotary body can be arranged in the same direction forming a uniform yarn, which can be delivered to the next step as such. Furthermore, since the rotary body having a number of ejection holes bored in the peripheral wall thereof and adapted to be rotated at high speed, is connected to the end extremity of the extruder, the uniform yarn can be obtained continuously only by feeding the granular or flaky resin material into the extruder 11 through the hopper 14. As can be understood from the above, this embodiment of the invention also permits the steps of drawing and cutting the filaments to be eliminated entirely, which would otherwise be required after spinning operation, and consequently it is possible to enhance the operational efficiency remarkably as compared with the conventional methods.

Figure 5:
FIGS. 5 and 6 are perspective views showing different configurations of the ejection hole formed in the peripheral wall of the hollow rotary unit according to this invention.
Figure 4:
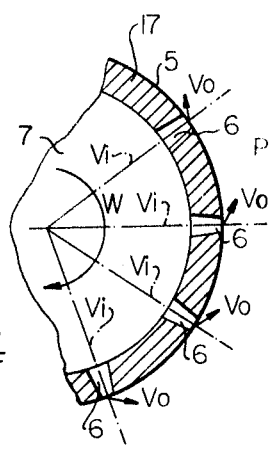
FIG. 4 is an enlarged cross-sectional view taken on the line 4—4 of FIG. 1.
Figure 6:

The detail structure of the rotary body used in the method and apparatus of this invention as described hereinabove, is shown in FIGS. 4 to 6, inclusive.

Namely, the ejection holes 6,6, ..... formed in the peripheral wall 17 of the rotary body 7, as shown in FIGS. 5 and 6, have a rectangular or circular cross section and the area of said cross section is reduced progressively successively from the interior wall surface to the exterior wall surface of the peripheral wall 17, i.e., the holes 6 are tapered from a greater area at the interior to a lesser area at the exterior.

The synthetic resin material P fed into the rotary body 7 through the hopper or the extruder and maintained molten by the heater, is pressed against the interior surface of the wall 17 under the centrifugal force developed therein due to rotation of the rotary body 7 and thus forced into the ejection holes 6,6, . When the cross-sectional areas of the inlet and outlet openings of the ejection hole is represented by $Si$ and $So$, and the velocities of the synthetic resin material at the inlet and outlet openings of the ejection hole by $Vi$ and $Vo$, respectively, the following relationship is established, because the density of the synthetic resin material is constant.

$$Si/So Vo/Vi$$

In addition, when representing the distance between the center of rotation and the interior wall surface of the rotary body by $\gamma i$, and where $W^2$ is the singular distance between the holes, the synthetic resin material, passing through the ejection hole, is subjected to a force represented by $W^2 \gamma i (Si-So)$ ($Si >> So$) more than in the case of an ejection hole having the cross-sectional area unchanged from the inlet opening to the outlet opening thereof, so that the molten synthetic resin material, having been forced into the ejection hole, is extruded outwardly through said hole with an extremely large force and spouted at a high velocity. At the same time, the molten resin material is rapidly cooled by the exterior wall of the rotary body 7 and forms a large number of fine elongate filaments.

By employing the apparatus for the production of synthetic resin fibers, comprising the rotary body according to the present invention as described above, the speed of rotation of the rotary body and the ejection velocity $V_o$ of the molten resin material are greater than in the case of apparatus using the conventional rotary body in which the cross-sectional area of each ejection hole is constant, and accordingly the fiber producing efficiency can be markedly enhanced. In addition, according to this invention, since the molten resin material is ejected from the rotary body by effectively making use of the centrifugal force developed therein, there is no fear of the ejection holes being clogged by the resin material, enabling a synthetic resin fiber of high quality to be produced continuously.

What I claim is:

1. An apparatus for the production of a heat-sensitive synthetic resin fiber by making use of centrifugal force, comprising a hollow rotary body having a plurality of ejection holes formed in the peripheral wall thereof and adapted to be rotated at high speed, means to heat the synthetic resin material charged in said rotary body comprising a heater disposed within said rotary body, means to feed a synthetic resin material to said rotary body comprising a supply tube in communication with the interior of said rotary body, and means to rotate said rotary body whereby a synthetic resin material charged in the rotary body and melted therein by the heat of said heaters or the synthetic resin material charged in said rotary body in a molten state and heated therein is ejected outwardly through the ejection holes under the action of the centrifugal force developed therein by the rotation of said rotary body.

2. An apparatus in accordance with claim 1 further comprising a fixed enclosure about said rotary body, said enclosure having an outlet coaxial with the axis of rotation of said rotary body whereby a twisted yarn may be continuously withdrawn therethrough.

3. An apparatus in accordance with claim 1 wherein said heater is annular in form and has openings passing therethrough, and wherein said supply tube, in communication with the interior of said rotary body, empties directly within said annular heater.

4. An apparatus in accordance with claim 1 wherein said apparatus is disposed vertically for gravity feed of resin particles to said rotary body, and wherein said rotary body has a substantially conical bottom.

5. In an apparatus for the production of a synthetic resin fiber in accordance with claim 1 wherein said ejection holes have a rectangular cross section the area of which is reduced progressively successively from the interior surface to the exterior surface of the wall of said rotary body.

6. In an apparatus for the production of a synthetic resin fiber in accordance with claim 1 wherein said ejection holes have a circular cross section the area of which is reduced progressively successively from the interior surface to the exterior surface of the wall of said rotary body.